United States Patent [19]

Ota

[11] 4,012,595
[45] Mar. 15, 1977

[54] SYSTEM FOR TRANSMITTING A CODED VOICE SIGNAL

[75] Inventor: Chuichi Ota, Tokyo, Japan

[73] Assignee: Kokusai Denshin Denwa Kabushiki Kaisha, Japan

[22] Filed: June 12, 1974

[21] Appl. No.: 478,768

[30] Foreign Application Priority Data
June 15, 1973 Japan .................. 48-66950

[52] U.S. Cl. .................................... 179/15 AS
[51] Int. Cl.² ...................................... H04J 5/00
[58] Field of Search .......... 179/1 SA, 15 AS, 15 A, 179/15 BW, 15.55 T, 15.55 W

[56] References Cited
UNITED STATES PATENTS

| 3,403,227 | 9/1968 | Malm | 179/1 SA |
|---|---|---|---|
| 3,790,715 | 2/1974 | Inose et al. | 179/15 A |
| 3,848,093 | 11/1974 | Edstrom | 179/15 AS |
| 3,864,524 | 2/1975 | Walker | 179/15 AS |

OTHER PUBLICATIONS

David, McDonald "Note on Pitch-Synchronous Processing of Speech", Bell Monograph, 1956.

Primary Examiner—Kathleen H. Claffy
Assistant Examiner—E. S. Kemeny
Attorney, Agent, or Firm—Robert E. Burns; Emmanuel J. Lobato; Bruce L. Adams

[57] ABSTRACT

A system for transmitting a coded voice signal representative of an original analogue voice signal, for improved performance in time assignment multiplex systems. A voice signal detector detects when the magnitude of the coded voice signal exceeds a certain predetermined value which corresponds to the presence of an original voice signal. A waveform analyzer estimates high frequency components of the original voice signal and the detected coded voice signal is transmitted at intervals determined by the measured values of the high frequency components. The transmitted coded voice signal is comprised of digital code units, and the number of bits in each code unit are reduced at low transmission speed by distributing the bits of the code units between more than one transmission interval.

4 Claims, 9 Drawing Figures

SYSTEM FOR TRANSMITTING A CODED VOICE SIGNAL

BACKGROUND OF THE INVENTION:

This invention relates to a coded voice signal transmission system.

One method that has heretofore been proposed for making effective use of a transmission line in a coded voice signal transmission system is a digital speech interpolation (DSI) system, in which the presence of a voice signal is detected so that only the detected voice signal is transmitted. This system merely utilizes a macroscopic characteristic of voice signal and its signal compression ratio is generally about ½ at most. With the combined use of this system and a system of removing a microscopic characteristic of the signal voice, for example, redundancy of the waveform of the voice, it is possible to make more effective use of the transmission line.

On the other hand, a method for removing redundancy of the voice waveform is a predictive encoding system and the typical one is a delta modulation system. This method periodically predicts mainly amplitude information. However, this method is effective in the case of relatively low quality transmission as compared with the conventional PCM system but is not effective in a public telephone circuit requiring high quality transmission characteristics.

SUMMARY OF THE INVENTION

An object of this invention is to provide a transmission system for a coded voice signal capable of efficient signal multiplexing with only negligible deterioration of the speech quality of the transmitted voice signal.

This invention is characterized in that short-time frequencies of an input voice signal are measured at predetermined periods and sampled values of the voice signal are transmitted at predetermined intervals in response to the result of the above measurement.

BRIEF DESCRIPTION OF THE DRAWINGS:

The principle, construction and operations of this invention will be clearly understood from the following detailed description taken in conjunction with the accompanying drawings, in which.

DESCRIPTION OF THE PREFERRED EMBODIMENTS

Figure 1A:
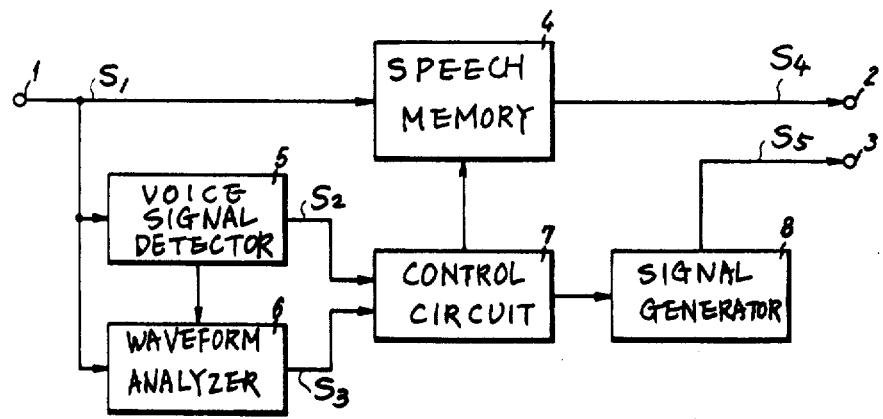
FIG. 1A is a block diagram illustrating an example of this invention.
Figure 1B:
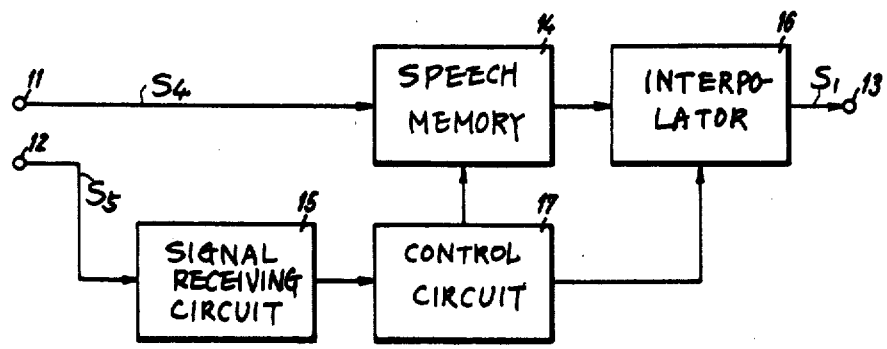
FIG. 1B is a block diagram illustrating a receiving device employed for receiving a signal transmitted in accordance with this invention.
Figure 2:
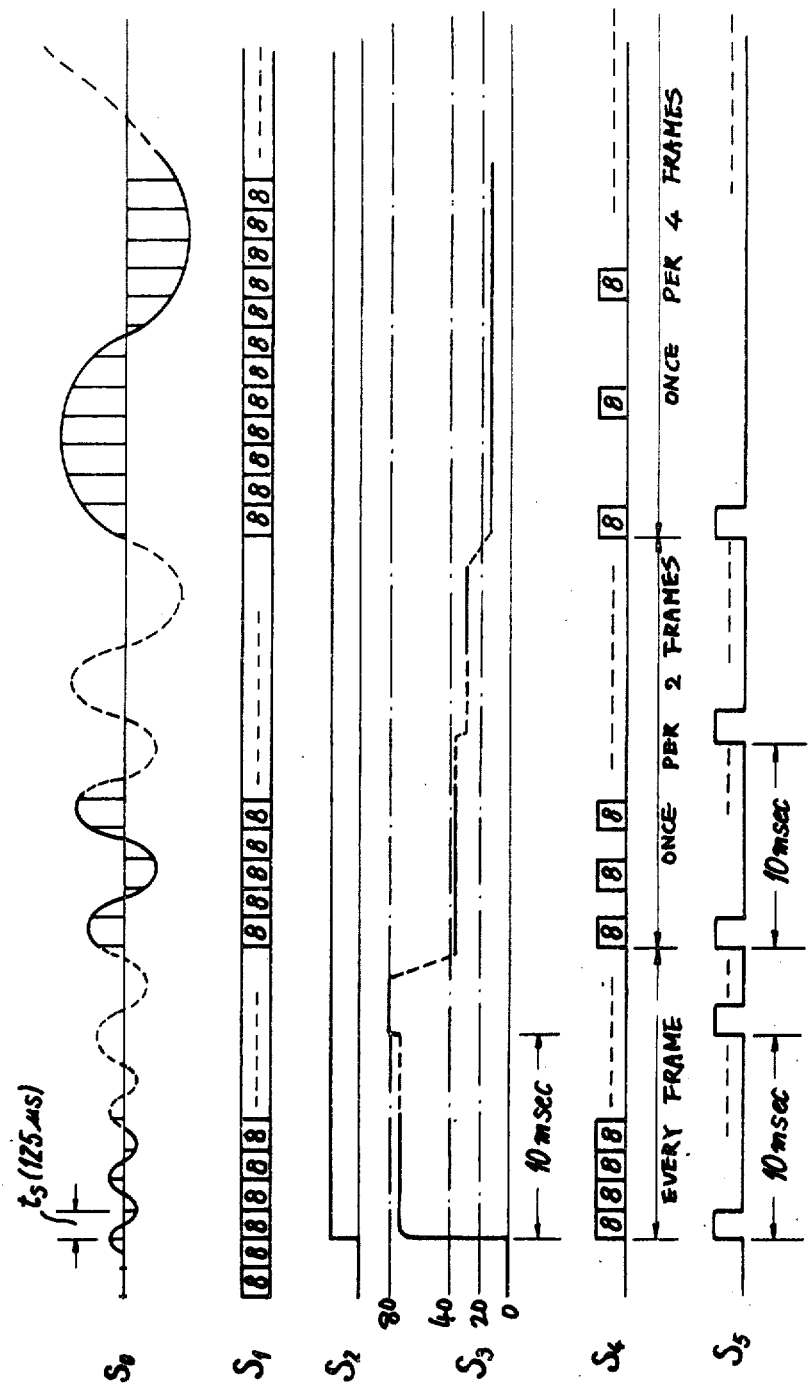
FIG. 2 illustrates timing charts explanatory of the operation of the example shown in FIG. 1A.

With reference to FIGS. 1A, 1B, and 2, the principle of this invention will be described below. In FIG. 1A, a reference numeral 1 indicates an input terminal for a coded voice signal $S_1$ obtained by sampling the original voice signal at sampling intervals $ts$ and encoding the original voice signal $S_0$; 2 designates an output terminal for a voice signal $S_4$ processed in accordance to this invention; 3 identifies an output terminal for a control signal $S_5$ indicative of the state of a voice signal output $S_4$ transmitted from the voice signal output terminal 2; 4 represents a speech memory for temporarily storing therein the coded voice signal $S_1$ samples in the incoming order; 5 denotes a voice signal detector for digitally detecting when the original voice signal $S_0$ encoded in the coded voice signal $S_1$ exceeds a predetermined threshold level; 6 shows a wave form analyzer for measuring, at predetermined interval (e.g. 10 milliseconds), frequencies of the original voice signal, so from the coded voice signal $S_1$ which is formed, for example, with a counting circuit for counting the number of zero-crossing instants in the original voice signal $S_0$ or a counting circuit for counting the number of extreme values in the original voice signal $S_0$; 7 refers to a control circuit for determining the intervals of transmission of sampled values of the original voice signal in response to the outputs of the circuits 5 and 6; and 8 indicates a control signal generator to produce the control signal $S_5$.

Referring now to FIG. 2, the operation of the above circuit shown in FIG. 1A will be described. A signal $S_0$ in FIG. 2 shows an original voice signal which has not yet been coded. This signal $S_0$ is sampled, for example, at 8 Kilo-Hz, and each of the sampled values is coded into eight bits to obtain code units such as $S_1$ shown in FIG. 2, which are applied to the terminal 1 in FIG. 1. The code units of eight bits are obtained every 125 micro-seconds (the period $ts$ of 125 micro-seconds will hereinafter be referred to as one frame). In this case, a first bit is indicative of the polarity of the corresponding sampled value, while a second bit and the others are indicative of the absolute value of the corresponding sampled value. The coded voice signal code unit $S_1$ applied to the terminal 1 are stored in the incoming order in the speech memory 2 and, also, applied to the voice signal detector 5 and the waveform analyzer 6. In the voice signal detector 5, the presence or absence of a voice signal in the coded voice signal is tested for by determining whether or not the original voice signal $S_0$ indicated by the coded voice signal $S_1$ exceeds a predetermined threshold level and, upon detection of the voice signal, a signal $S_2$ is transmitted to the waveform analyzer 6 and the control circuit 7. One example of its waveform $S_2$ is shown in FIG. 2. In the waveform analyzer 6, measurement of short-time frequencies of the original voice signal $S_0$ included in the voice coded signal $S_1$ applied from the terminal 1 starts by a voice-detection indicating signal $S_2$ derived from the voice signal detector 5, and the results of the measurement are transmitted to the control circuit 7 at constant intervals (e.g; 10 milli-seconds). If it is assumed that the waveform analyzer 6 is formed by a zero-crossing counting circuit for counting the zero-crossings of the original signal $S_0$, the number of polarity reversals of the first bit, i.e., the polarity bit, is counted and each counted result is provided at the end of the counting period and maintained during ten milli-seconds. At a signal $S_3$ in FIG. 2, the time positions are shifted by 10 milli-seconds for convenience of description. In this case, the period for measurement is 10 milli-seconds, so that in the case of short-time frequency of 4 KHz included in the original voice signal so represented by the coded voice signal $S_1$, the measured value is 80; in the case of 2 KHz, the measured value is 40; and in the case of 1 KHz, the measured value is 20. In the control circuit 7, transmission of the coded voice signal $S_1$ is determined in response to the voice detecting signal $S_2$ supplied from the voice signal detector 5. Further, its transmission period is dependent upon the counted value $S_3$ supplied from the waveform analyzer 6. For example, if the measured value is in the range of 41 to 80, short-time frequencies exceeding 2 KHz are included in the original voice signal $S_0$, so that the coded voice signal $S_1$ indicative of the sampled values of the original voice signal $S_0$ are transmitted as it is. Consequently, the transmission intervals are 125 micro-seconds and the state in such a case is represented by the control circuit 7 as a control code unit 11. When the measured value is in the range of 21 to 40, the transmission intervals are 250 micro-seconds and the coded voice signal $S_1$ is transmitted once every two frames and this state is represented by a control code unit 10. When the measured value is less than 20, the transmission intervals are 500 micro-seconds and the coded voice signal $S_1$ is transmitted once every four frames and this state is represented by a control code unit 01. The state in which no voice signal is detected is represented by a control code unit 00 and, in this case, no coded voice signal is transmitted. The signal $S_1$ is read out from the speech memory 4 at the intervals determined as mentioned above, and such a read-out signal $S_4$ as shown in FIG. 2 is transmitted to the output terminal 2. The timing of the signal $S_4$ is also applied to the control signal generator 8 and then, the control signals $S_5$ indicative of the above states 11, 10, 01, and 00 are produced and transmitted from the control signal generator 8 to the terminal 3. The control signal $S_5$ is usually formed by two bits indicative of the above-mentioned states and, in general, for error protection in the transmission line, six bits are employed for decision by majority, for each bit, of three transmissions. This signal $S_5$ is sent out at a constant period with serial synchronization bits added: in this case, every 10 milli-seconds. It is also possible, of course, to send out the signal $S_5$ at each change of state.

FIG. 1B illustrates a block diagram of the receiving device. A reference numeral 11 indicates an input terminal for a received coded voice signal $S_4$; 12 designates an input terminal for a received control signal $S_5$; 13 represents an output terminal of a regenerated coded voice signal $S_1$; 14 identifies a speech memory for temporarily storing therein the coded voice signal $S_4$ in the incoming order; 15 denotes a signal receiving circuit for receiving the control signal $S_5$; 16 shows an interpolator for reproducing the original coded voice signal $S_1$ from the received coded voice signal $S_1$ by interpolation as occasion demands; and 17 refers to a control circuit for controlling the operations of the speech memory 14 and the interpolator 16 in accordance with the transmission intervals.

In FIG. 1B, a received voice signal $S_4$ and a received control signal $S_5$ are applied to the terminals 11 and 12, respectively. The received voice signal $S_4$ applied to the terminal 11 is fed to the speech memory 14 and temporarily stored therein. On the other hand, the control signal $S_5$ applied to the terminal 12 is fed to the signal receiving circuit 15 and decoded therein (the signal is usually subjected to an error control), thereafter being transmitted to the control circuit 17. In the control circuit 17, the decoded transmission intervals are stored, and a control signal corresponding to the intervals is applied to the speech memory 14 and the interpolator 16. In the interpolator 16, interpolation is achieved in response to the signal $S_4$ stored in the speech memory 14. The interpolation may be achieved by various methods but, let it be assumed here that the simplest interpolarition of the first degree is effected. If the transmission intervals are 125 micro-seconds, the coded voice signal $S_4$ is transmitted for each frame, so that no interpolation is required and the voice signal $S_4$ is applied, as it is, to the terminal 13. In the case where the transmission intervals are 250 micro-seconds, the voice signal $S_4$ is only transmitted once for each two frames, so that the voice signal $S_4$ of a non-transmitted frame is formed by the interpolation of the first-degree from the voice signals $S_4$ of the immediately preceding and succeeding frames and applied to the terminal 13. In a case where the transmission intervals are 500 micro-seconds, the voice signal $S_4$ is only transmitted once for each four frames, so that the voice signals $S_4$ of the remaining, non-transmitted three frames are formed by interpolation from the voice signals $S_4$ of the immediately preceding and succeeding, transmitted frames and then applied to the terminal 13. In case of the interpolation of the more than second degree, similar procedures are possible. However, in such a case, the capacity of the speech memory 14 increases with the used degree number. In accordance with the above operations, the signal $S_1$ applied to the input terminal 1 can be reproduced at the output terminal 13.

In the above example, the voice signal $S_4$ and the control signal $S_5$ are transmitted by separated transmission lines, respectively, but it is also possible to transmit both of them by the same transmission line in the same time axis.

Figure 3A:
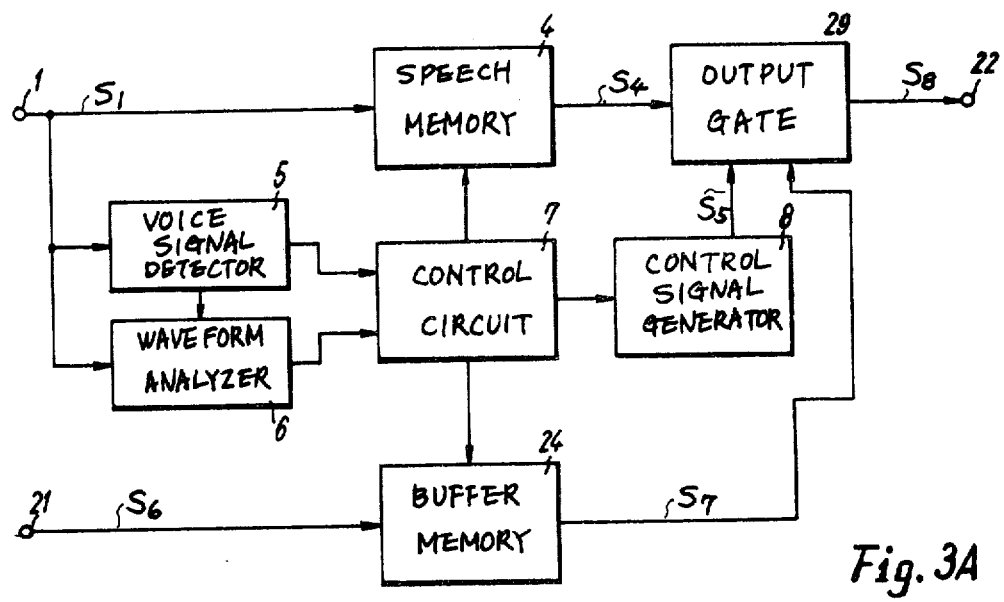
FIG. 3A is a block diagram illustrating an example of this invention applied to the transmission of a voice signal and non-speech type information.

FIG. 3A illustrates another example of this invention, in which non-speech type information is transmitted in a time during which no voice signal is transmitted. In FIG. 3A, a reference numeral 1 indicates an input terminal for a coded voice signal $S_1$; 21 designates an input terminal for a non-speech type information signal $S_6$, for example, a telegraph signal $S_8$; 22 identifies an output terminal for a signal processed in accordance with this invention; 24 denotes a buffer memory for temporarily storing therein the non-speech type information signal $S_6$ and regenerating it as a signal $S_7$; 29 represents an output gate; and 4, 5, 6, 7 and 8 show the same circuits as those in FIG. 1A.

Figure 4:
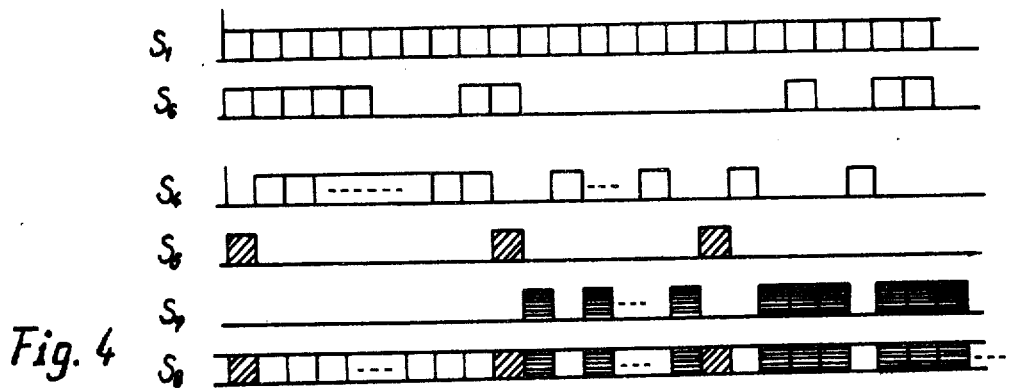
FIG. 4 illustrates timing charts explanatory of the operation of the device shown in FIG. 3A.

With reference to FIG. 4, the operation of this example shown in FIG. 3A will be described. The coded voice signal $S_1$ is applied to the terminal 1. Processing steps of this signal S1 are substantially the same as in FIG. 1A. However, in this case, the coded voice signal $S_1$, the control signal $S_5$ and the non-speech type information signal $S_6$ are transmitted by the same transmission line in the same time axis, so that processing steps in this example are a little different from that in the foregoing example in that overlapping of respective time positions of the signals is prevented. As a result of the above processing steps, the voice signal $S_4$ and the control signal $S_5$ are both transmitted to the output gate 29. In this case, it is necessary that the control signal $S_5$ generated from the signal generator 8 be separated from the other signals $S_4$, $S_7$ and this separation may be effected by a method of transmitting the signal $S_5$ at a constant period of by a method using special code units. On the other hand, the non-speech type information signal $S_6$ is applied to the terminal 21 and then to the buffer memory 24 to be temporarily stored therein. In a case where the transmission intervals are other than 125 micro-seconds, the transmission line is not completely occupied so that a control signal is fed from the control circuit 7 to the buffer memory 24 to send-out the non-speech type information signal $S_6$ in the unoccupied time of the transmission line. The output $S_7$ of the buffer memory 24 is applied to the output gate 29. The output gate 29 sequentially gates the signals $S_4$, $S_5$ and $S_7$ fed thereto from the speech memory 4, the control signal generator 8 and the buffer memory 24 to apply them to the terminal 22. The signal $S_8$ thus provided at the terminal 22 is transmitted by the transmission line.

Figure 3B:
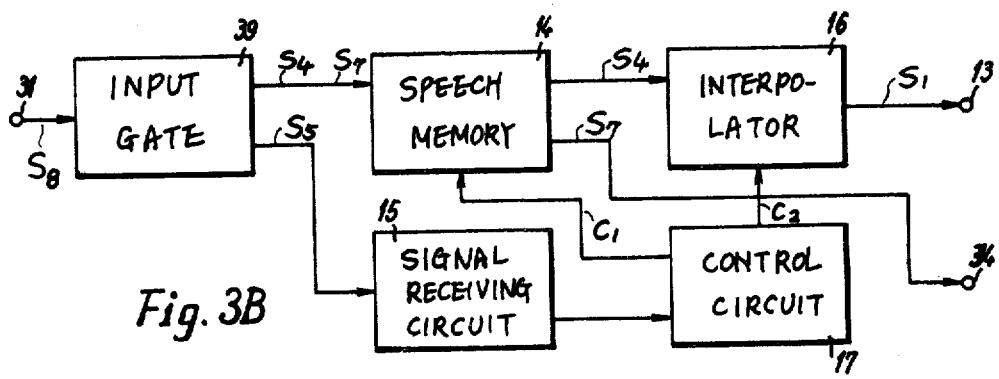
FIG. 3B is a block diagram illustrating a receiving device employed for receiving a signal provided by the example shown in FIG. 3A.

FIG. 3B shows a block diagram of the receiving device for receiving the signal $S_8$. A reference numeral 31 indicates an input terminal for a received signal $S_8$; 13 designates an output terminal for a regenerated coded voice signal $S_1$; 34 identifies an output terminal for a non-speech type information signal $S_7$; 39 denotes an input gate, and 14, 15, 16 and 17 represent the same circuits as those in FIG. 1B. In FIG. 3B, the received signal $S_8$ is applied to the input terminal 31 and then fed therefrom to the input gate 39. In the input gate 39, the voice signal ($S_4$), the non-speech type information signal ($S_7$) and the control signal ($S_5$) are separated and applied to the speech memory 14 and the signal receiving circuit 15, respectively. In the speech memory 14, the voice signal ($S_4$) and the non-speech type information signal ($S_7$) are temporarily stored. In the signal receiving circuit 15, the control signal ($S_5$) is received and decoded, and the output of this circuit is fed to the control circuit 17. In the control circuit 17, a first control signal $C_1$ for separating the voice signal ($S_4$) and the non-speech type information signal ($S_7$) from each other, and a second control signal $C_2$ for interpolation are produced. The former $C_1$ is applied to the speech memory 14 and the latter $C_2$ is applied to the interpolator 16. Upon application of the control signal $C_1$ from the control circuit 17 to the speech memory 14, the voice signal $S_4$ and the non-speech type information signal $S_7$ are applied to the interpolator 16 and the terminal 34, respectively. In the interpolator 16, interpolation is achieved by the control signal $C_2$ from the control circuit 17 in the same manner as in the case of FIG. 1B and the reproduced voice signal $S_1$ is fed to the terminal 13. In this manner, the signals $S_1$ and $S_7$ applied respectively to the terminals 1 and 21 are derived at the terminals 13 and 34 of the receiving device.

Figure 5A:
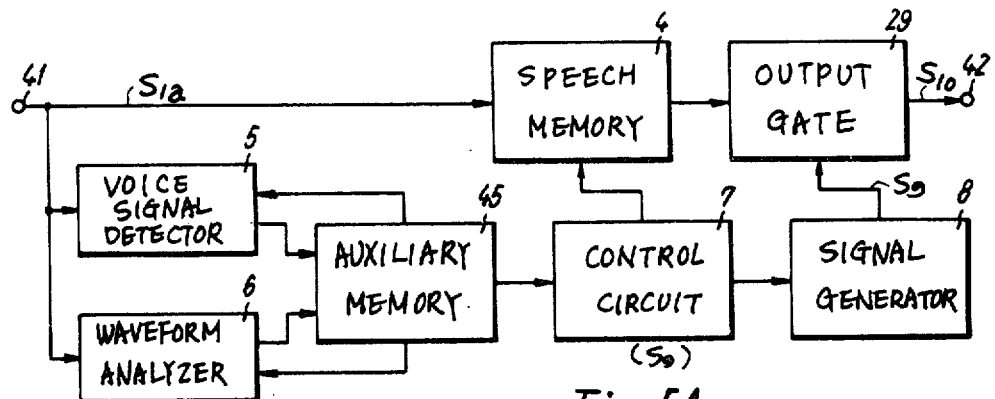
FIG. 5A is a block diagram illustrating another example of this invention applied to the transmission of a multiplexed voice signal.

FIG. 5A illustrates another example of this invention applied to the case of lump-processing of a multiplexed voice signal. In FIG. 5A, a reference number 41 indicates an input terminal for a time-division multiplexed voice signal $S_1a$; 42 designates an output terminal for a signal $S_{10}$ processed in accordance with this invention; 45 identifies an auxiliary memory for the circuits 5 and 6; and 29 denotes an output gate. The circuits 4, 5, 6, 7 and 8 are identical with those shown in FIG. 1A except that they are used in the time-divisional manner.

Figure 6:
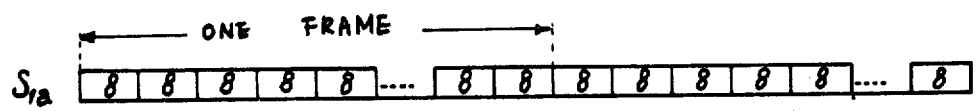
FIG. 6 illustrates timing charts explanatory of the operations of the example shown in FIG. 5A.
Figure 6:
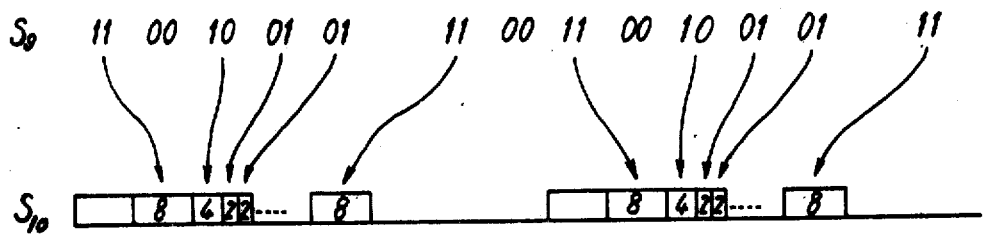

With reference to FIG. 6, the operations of the example shown in FIG. 5A will be described. The operations of this example are basically identical with those in the example shown in FIG. 1A except that the multiplexed voice signal $S_1a$ are lump-processed in the time-divisional manner and that the numbers of transmission bits of respective frames are averaged to be equal to one another. Namely, a time-division multiplexed coded voice signal $S_1a$ is applied to the input terminal 41. Let it be assumed that each channel is provided with eight bits. This signal $S_1a$ is stored in the speech memory 4 and, also, applied to the voice signal detector 5 and the waveform analyzer 6. In the voice signal detector 5 and the waveform analyzer 6, detection of voice signals of respective channels and measurement of their short-time frequencies are effected in the time-divisional manner, respectively and, at this time, the auxiliary memory 45 is used. In the auxiliary memory 45, the detected presence or absence of the voice signal of each channel and the measured values of its short-time frequencies are stored, and they are applied to the control circuit 7. In the control circuit 7, it is determined in the same manner as in the case of FIG. 1A whether the voice signal is transmitted for each channel or not and, if it is determined to be transmitted, its transmission intervals are determined, providing such states $S_9$ as shown in FIG. 6. Namely, a code unit 00 is indicative of a state in which no voice signal is transmitted; code unite 01 is indicative of a state in which the voice signal is transmitted at intervals of 500 microseconds; a code unit 10 is indicative of a state in which the voice signal is transmitted at intervals of 250 microseconds (e.g.; two frames); and a code unit 11 is indicative of a state in which the voice signal is transmitted at intervals of 125 microseconds. A control for reading contents of the speech memory 4 is produced in view of the indicated state. In this case, the control signal is formed such that no read-out operation is effected for a channel in the state 00; that although eight bits are read out every 500 microseconds (e.g.; four frames) for a channel in the state 01, two bits are read out every 125 microseconds (e.g., one frame); that four bits are read out every 250 microseconds for a channel in the state 10; and that eight bits are read out every 125 microseconds for a channel in the state 11. In response to the control signal, the output of the speech memory 4 is applied to the output gate 29. On the other hand, in the signal generator 8, a control signal $S_9$ is produced in view of the state indication in the control circuit 7 and applied to the output gate 29. The output gate 29 gates the voice signal from the speech memory 4 and the control signal $S_9$ from the signal generator 8, and the gated signals $S_{10}$ are fed to the terminal 42. As a result of this, such a signal $S_{10}$ as shown in FIG. 6 is derived at the terminal 42.

Figure 5B:
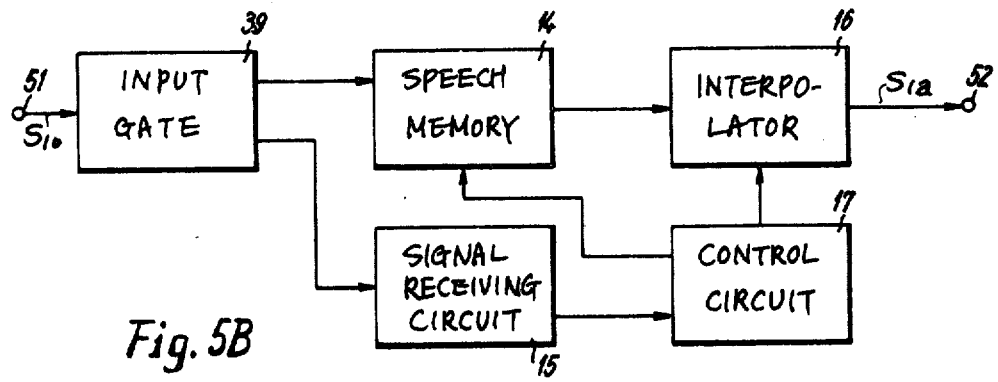
FIG. 5B is a block diagram illustrating a receiving device employed for receiving a signal provided by the example shown in FIG. 5A.

The receiving device has the construction as shown in FIG. 5B. In FIG. 5B, a reference numeral 51 designates an input terminal for a received signal $S_{10}$; 52 indicates an output terminal for a multiplexed voice signal $S_1a$; and 39 identifies an input gate. Reference numerals 14, 15, 16 and 17 show the same circuits as those in FIG. 1B and, in this case, they are used in the time-divisional manner. The received signal $S_{10}$ is applied to the terminal 51 and then to the input gate 39. In the input gate 39, the voice signal and the control signal ($S_9$) are separated from each other and applied to the speech memory 14 and the signal receiving circuit 15, respectively. Thereafter, exactly the same-operations as those in FIG. 1B are achieved in the time-divisional manner for each channel, whereby the multiplexed voice signal $S_{10}$ applied to the speech to the speech memory 41 is reproduced and derived as the signal $S_1a$ at the terminal 52.

Examples of numerical values obtainable with the construction of FIGS. 5A and B are as follows: The operation factor of a voice signal (the ratio of the time for the voice signal transmission to the time during which the circuit is connected) is 40%; and if it is taken into consideration that energy of a voice signal is almost all in the vicinity of 1 KHz, the number of channels of the transmission lines is less than 15 including bits for the control signal in a case where the number of input channels is, for example 60.

As has been described in the foregoing, this invention enables equivalent bandwidth compression of a voice signal without impairing the speech quality by applying a voice waveform redundancy removing system to DSI with a simple apparatus. Consequently, the system of this invention is of great utility when employed in a communication system in which the cost of the transmission line is high as in an international communication system.

What I claim is:

1. A system for transmitting a coded voice signal, comprising: input terminal means for receiving a train of code units representative of the coded voice signal obtained by sampling at sampling intervals and encoding an original voice signal; speech memory connected to the input terminal means for successively storing the train of code units; detector means connected to the input terminal means for digitally detecting from the code units when the original voice signal exceeds a predetermined threshold level; waveform analyzer means connected to the input terminal means and the detector means for measuring the short-time frequency of the original voice signal from the train of code units, at constant intervals during a period where the detector means detects the coded voice signal; control means connected to the detector means, the waveform analyzer means and the speech memory for generating control outputs to selectively read-out the code units from the speech memory so that the transmission intervals of the read-out code units correspond to the short-time frequency of the original voice signal measured by the waveform analyzer; signal generator means connected to the control means for generating a control signal respresentative of the transmission intervals; first output terminal means connected to the speech memory for sending out the read-out code units to a transmission line; and second output terminal means connected to the signal generator means for sending out the control signal to a transmission line.

2. A system for transmitting a coded voice signal according to claim 1, in which the number of bits of each code unit of the transmitted coded signal is reduced by distributing the bits of each code unit to even number frames of said sampling intervals.

3. A system for transmitting a coded voice signal according to claim 1, further including second input terminal means for receiving non-speech information, buffer memory means connected to the second input terminal means and said control means for temporarily storing the non-speech information and for reading out the non-speech information at time slots when the code units are not read out from the speech memory, and means connected to the buffer memory means for coupling the read out non-speech memory to a transmission line.

4. A system for transmitting a coded voice signal according to claim 1, further including auxiliary memory means connected to said detector means and the waveform analyzer means for time-divisionally handing a multiplex coded voice signal represented by the train of code units.

* * * * *